United States Patent
Kumar et al.

(10) Patent No.: US 12,170,096 B2
(45) Date of Patent: Dec. 17, 2024

(54) UPSAMPLING OF AUDIO USING GENERATIVE ADVERSARIAL NETWORKS

(71) Applicant: Descript, Inc., San Francisco, CA (US)

(72) Inventors: Rithesh Kumar, Montreal (CA); Kundan Kumar, Montreal (CA)

(73) Assignee: Descript, Inc., San Francisco, CA (US)

( * ) Notice: Subject to any disclaimer, the term of this patent is extended or adjusted under 35 U.S.C. 154(b) by 476 days.

(21) Appl. No.: 17/478,722

(22) Filed: Sep. 17, 2021

(65) Prior Publication Data

US 2022/0101872 A1 Mar. 31, 2022

Related U.S. Application Data

(60) Provisional application No. 63/083,474, filed on Sep. 25, 2020.

(51) Int. Cl.
| | |
|---|---|
| *G10L 25/18* | (2013.01) |
| *G06F 3/16* | (2006.01) |
| *G06N 3/045* | (2023.01) |
| *G06N 3/088* | (2023.01) |
| *G10L 19/02* | (2013.01) |
| *G10L 25/30* | (2013.01) |

(52) U.S. Cl.
CPC ............. *G10L 25/18* (2013.01); *G06F 3/165* (2013.01); *G06N 3/045* (2023.01); *G06N 3/088* (2013.01); *G10L 19/02* (2013.01); *G10L 25/30* (2013.01)

(58) Field of Classification Search
CPC ......... G10L 25/18; G10L 19/02; G10L 25/30; G10L 21/007; G10L 21/0388; G06F 3/165; G06N 3/045; G06N 3/088
See application file for complete search history.

(56) References Cited

U.S. PATENT DOCUMENTS

| | | | | |
|---|---|---|---|---|
| 2011/0015931 A1* | 1/2011 | Kawahara | ............... | G10L 21/00 704/E13.007 |
| 2011/0191101 A1* | 8/2011 | Uhle | ................... | G10L 21/0208 704/205 |
| 2016/0007130 A1* | 1/2016 | Germain | .................. | H04R 3/00 381/58 |
| 2019/0043507 A1* | 2/2019 | Huang | ................... | G10L 17/24 |
| 2019/0355347 A1* | 11/2019 | Arik | ....................... | G06N 20/20 |

(Continued)

*Primary Examiner* — Michael N Opsasnick
(74) *Attorney, Agent, or Firm* — Perkins Coie LLP; Andrew T. Pettit

(57) ABSTRACT

Introduced here are approaches to training and then employing computer-implemented models designed to upsample discrete audio signals to higher sampling rates. Assume, for example, that a media production platform obtains a first discrete signal at a relatively low sampling rate. The relatively low sampling frequency may make the first discrete audio signal unsuitable for inclusion in media compilations, so the media production platform may attempt to improve its quality through upsampling. To accomplish this, the media production platform can apply a transform to the first discrete signal to produce a first magnitude spectrogram. Then, the media production platform can apply a computer-implemented model to the first magnitude spectrogram to produce a second magnitude spectrogram. Thereafter, the media production platform can apply an inverse transform to the second magnitude spectrogram to create a second discrete signal that has a higher sampling rate than the first discrete audio signal.

15 Claims, 15 Drawing Sheets

(56) References Cited

U.S. PATENT DOCUMENTS

| | | | |
|---|---|---|---|
| 2019/0392802 A1* | 12/2019 | Higurashi | G06N 20/00 |
| 2020/0066296 A1* | 2/2020 | Sargsyan | G10L 21/0232 |
| 2020/0175961 A1* | 6/2020 | Thomson | G10L 15/28 |
| 2020/0175962 A1* | 6/2020 | Thomson | G10L 15/30 |
| 2020/0175987 A1 | 6/2020 | Thomson et al. | |
| 2020/0243094 A1* | 7/2020 | Thomson | G10L 15/32 |
| 2020/0335086 A1* | 10/2020 | Paraskevopoulos | G10L 25/30 |
| 2022/0101864 A1* | 3/2022 | Kumar | G10L 19/02 |
| 2022/0101872 A1* | 3/2022 | Kumar | G06N 3/088 |

* cited by examiner

500

501 Receive input that specifies a desired sampling rate

502 Examine a primary database that includes trained models associated with different sampling rates

503 Determine that none of the trained models in the primary database are associated with the desired sampling rate

504 Obtain multiple magnitude spectrograms that are associated with the desired sampling rate

505 Provide the multiple magnitude spectrograms to an untrained model as training data

506 Store the trained model in the primary database

507 Populate a data structure with information so as to programmatically associate the trained model with the desired sampling rate

FIGURE 5

UPSAMPLING OF AUDIO USING GENERATIVE ADVERSARIAL NETWORKS

CROSS-REFERENCE TO RELATED APPLICATIONS

This application claims priority to U.S. Provisional Application No. 63/083,474, titled "Upsampling of Audio using Generative Adversarial Network (GAN) Super-Resolution (SR) Models" and filed on Sep. 25, 2020, which is incorporated by reference herein in its entirety.

TECHNICAL FIELD

Various embodiments concern computer programs and associated computer-implemented techniques for upsampling audio signals to higher sampling frequencies.

BACKGROUND

In the field of signal processing, the term "sampling" refers to the reduction of a continuous signal to a discrete signal. A common example is the conversion of audio in the form of a sound wave to a sequence of samples arranged in a temporal order. A continuous signal may be sampled at a given frequency—referred to as the "sampling rate" or "sampling frequency"—to produce a discrete signal that is comprised of values corresponding to different points in time. Ideally, these values are equivalent to the instantaneous values of the continuous signal at those points in time. A common unit to specify the rate at which a continuous signal is sampled is hertz (Hz). The sampling rate specifies the frequency at which the continuous signal is sampled per unit of time, so 100 Hz is equivalent to 100 samples per second.

BRIEF DESCRIPTION OF THE DRAWINGS

FIG. 5 depicts a flow diagram of another process for training a model that is to be used to upsample discrete audio signals.

Figure 1:
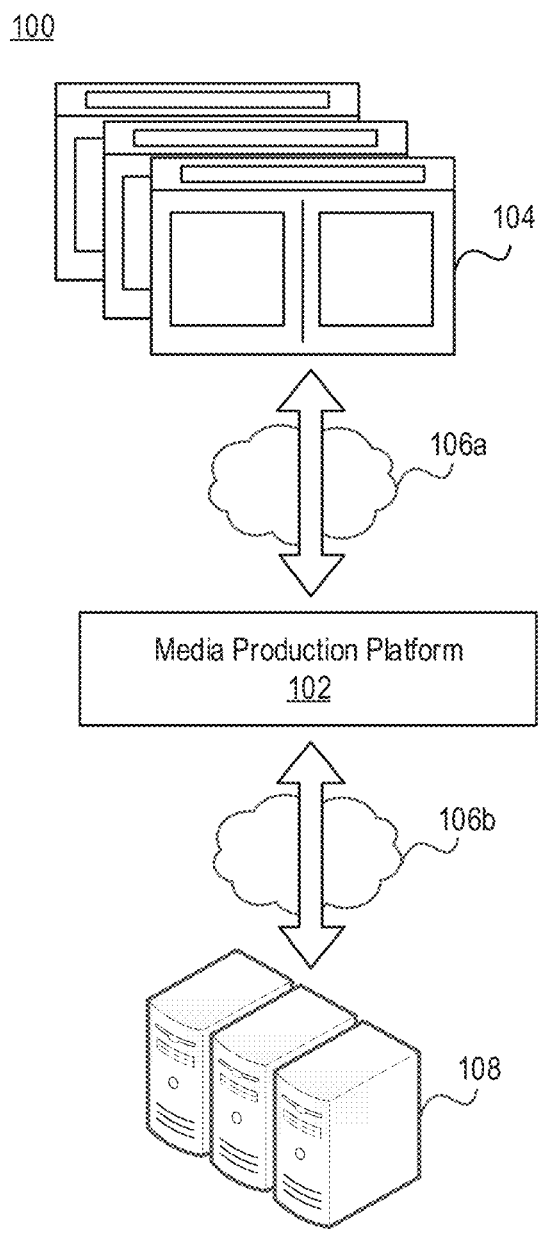
FIG. 1 illustrates a network environment that includes a media production platform responsible for creating the interfaces through which individuals (also referred to as "users" or "developers") can produce media content.

Various features of the technology described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technology. Accordingly, while specific embodiments are shown in the drawings, the technology is amenable to various modifications.

DETAILED DESCRIPTION

One of the areas in which sampling is most popular is the processing of audio signals. Sampling is useful for ensuring that audio signals can be stored, retrieved, and transmitted with minimal loss of quality. There is a tradeoff when it comes to sampling rate, however. While a higher sampling rate will ensure that a discrete audio signal more faithfully mirrors the continuous audio signal from which it is derived, higher sampling rates result in larger files that can be more difficult to handle in a resource-efficient manner. For reference, Moving Picture Experts Group (MPEG) audio is normally sampled at a rate of 22,050 Hz while compact disc (CD) audio is normally sampled at a rate of 44,100 Hz.

Humans are able to hear audio covering a range of roughly 20-2,000 Hz. To fully capture the useful information across this range of frequencies, a minimum sampling rate of roughly 40,000 Hz is required according to the Nyquist-Shannon sampling theorem. At a high level, the Nyquist-Shannon sampling theorem establishes a sufficient condition for a sampling rate that permits a discrete audio signal of individual samples to capture all of the information from a continuous audio signal of finite bandwidth. The Nyquist-Shannon sampling theorem introduces the concept of a sampling rate that is sufficient for perfect fidelity for the class of mathematical functions that are band-limited to a given bandwidth, such that no actual information is lost in the sampling process. This is why continuous audio signals, for example, in the form of audio waveforms, have historically been sampled at rates of 44,100 Hz, 48,000 Hz, 88,200 Hz, and 96,000 Hz.

Today, much lower sampling rates are used in various contexts. For example, the vast majority of telephones and wireless microphones sample at a rate of 8,000 Hz since nearly all energy for most phonemes is contained in the 100-4,000 Hz range. Many Voice over Internet Protocol (VOIP) products sample at a rate of 16,000 Hz, while many text-to-speech (TTS) products sample at a rate of 16,000-24,000 Hz. These low sampling rates make it difficult, if not impossible, to then produce another approximation of the continuous audio signal at a higher sampling rate. Said another way, producing another discrete audio signal with a different sampling rate (e.g., a higher sampling rate) is difficult when the continuous audio signal is initially sampled at such a low rate.

Assume, for example, that an individual is interested in producing a media compilation from discrete audio signals created, recorded, or otherwise produced by the above-mentioned products. For instance, the individual may be interested in creating the media compilation from a first discrete audio signal that is generated by a VOIP product and a second discrete audio signal that is generated by another VOIP product. The first and second discrete audio signals may be associated with a pair of individuals who engaged in a conversation or who separately recorded lines of dialogue. Because the discrete signals have relatively low sampling rates, the quality of the media compilation may be less than ideal.

One option for improving the quality is to upsample the first and second discrete signals. The terms "upsampling," "expanding," and "interpolating" refer to the process of resampling a discrete audio signal to increase the sampling rate by a desired factor. When upsampling is performed on a discrete audio signal, it produces another approximation of the continuous audio signal that would have been obtained by sampling at a higher rate. For example, if a discrete audio signal having a rate of 44,100 samples per second is upsampled by a factor of 5-to-4, then the resulting discrete audio signal will have a rate of 55,125 samples per second.

Accurately upsampling in a resource-efficient manner is difficult, however, especially for discrete signals that include human voices. For this reason, entities have historically found it to be more effective to reduce noise in an attempt to improve quality rather than alter the sampling rate. If an entity wished to improve the quality of a discrete signal at a given sampling frequency (e.g., 22,050 Hz), then the entity would have simply applied filters to "clean" the discrete signal. In this scenario, the "clean" discrete signal will still have the same sampling frequency as the original "noisy" discrete signal.

Introduced here are computer programs and associated computer-implemented techniques for upsampling discrete audio signals to higher sampling rates in order to improve quality. When a discrete signal is obtained by a media production platform, the discrete signal can be upsampled in such a manner that it can be used in media productions (also referred to as "media compilations"). While not the focus of the present disclosure, the technology described herein could be combined with, for example, filters (e.g., to remove noise) so as to further improve quality.

Assume, for example, that a media production platform obtains a first discrete signal at a relatively low sampling rate. The term "relatively low sampling rate," as used herein, may refer to sampling frequencies of less than 40,000 Hz. Examples of relatively low sampling frequencies include 8,000 Hz, 16,000 Hz, 22,050 Hz, and 24,000 Hz. The relatively low sampling frequency may make the first discrete audio signal unsuitable for inclusion in a high-quality media compilation, so the media production platform may attempt to improve its quality through upsampling. To accomplish this, the media production platform can apply a mathematical transform (or simply "transform") to the first discrete signal to produce a first magnitude spectrogram. In mathematics, a transform maps a function from its original function space into another function space via integration. One example of a transform is a Fourier transform that decomposes a function based on temporal frequency. Examples of Fourier transforms include the short-time Fourier transform (STFT) and fractional Fourier transform (FFT).

Then, the media production platform can apply a computer-implemented model (or simply "model") to the first magnitude spectrogram to produce a second magnitude spectrogram. While the first magnitude spectrogram corresponds to the sampling rate of the first discrete signal, the second magnitude spectrogram corresponds to the sampling rate to which the first discrete signal is to be upsampled. This sampling rate may be referred to as the "desired sampling rate." As an example, the first magnitude spectrogram may correspond to 22,050 Hz while the second magnitude spectrogram may correspond to 44,100 Hz. As further discussed below, the model can be trained with a series of magnitude spectrograms associated with discrete audio signals with a desired sampling rate (e.g., 44,100 Hz) in such a manner that it learns the characteristics of those discrete audio signals. Using these characteristics, the model can alter a magnitude spectrogram provided as input to produce another magnitude spectrogram corresponding to the desired sampling rate. Thereafter, the media production platform can apply an inverse mathematical transform (or simply "inverse transform") to the second magnitude spectrogram to create a second discrete signal that has a higher sampling rate than the first discrete audio signal. One example of an inverse transform is an inverse Fourier transform. Examples of inverse Fourier transforms include the inverse short-time Fourier transform (ISTFT) and inverse fractional Fourier transform (IFFT).

Embodiments may be described with reference to particular computer programs, networks, content, etc. However, those skilled in the art will recognize that these features are equally applicable to other types of computer programs, networks, content, etc. For example, while embodiments may be described in the context of a computer program implemented on a network-accessible server system, the relevant features may be similarly applicable to computer programs implemented on computing devices such as mobile phones, tablet computers, or personal computers. As another example, while embodiments may be described in the context of upsampling discrete signals from 22,050 Hz to 44,100 Hz, those skilled in the art will recognize that those sampling rates have been selected for the purpose of illustration. The approaches described herein may be similarly applicable regardless of the actual sampling rates.

Note that while embodiments may be described in the context of computer-executable instructions for the purpose of illustration, aspects of the technology can be implemented via hardware, firmware, or software. As an example, a media production platform may be embodied as a computer program through which an individual may be permitted to review content (e.g., text, audio, or video) to be incorporated into a media compilation, create media compilations by compiling different forms of content or multiple files of the same form of content, and initiate playback or distribution of media compilations.

Terminology

References in this description to "an embodiment" or "one embodiment" mean that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," or any variant thereof is intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers broadly to software components, firmware components, or hardware components. Modules are typically functional components that generate output(s) based on input(s). A computer program may include one or more modules. Thus, a computer program may include multiple modules that are responsible for completing different tasks but work in concert with one another, for example, where the output produced by one module is provided to another module as input. Alternatively, a computer program may include a single module that is responsible for completing all tasks.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open ended.

Overview of Media Production Platform

FIG. 1 illustrates a network environment 100 that includes a media production platform 102. Individuals (also referred to as "users" or "developers") can interact with the media production platform 102 via interfaces 104 as further discussed below. For example, individuals may be able to generate, edit, or view media content through the interfaces 104. Examples of media content include text content such as stories and articles, audio content such as radio segments and podcasts, and video content such as television programs and presentations. Meanwhile, the individuals may be persons interested in recording media (e.g., audio content), editing media (e.g., to create a podcast or audio tour), etc.

As shown in FIG. 1, the media production platform 102 may reside in a network environment 100. Thus, the computing device on which the media production platform 102 is executing may be connected to one or more networks 106a-b. The network(s) 106a-b can include personal area networks (PANs), local area networks (LANs), wide area networks (WANs), metropolitan area networks (MANs), cellular networks, the Internet, etc. Additionally or alternatively, the computing device can be communicatively coupled to other computing device(s) over a short-range wireless connectivity technology, such as Bluetooth®, Near Field Communication (NFC), Wi-Fi® Direct (also referred to as "Wi-Fi P2P"), and the like. As an example, the media production platform 102 is embodied as a "cloud platform" that is at least partially executed by a network-accessible server system in some embodiments. In such embodiments, individuals may access the media production platform 102 through computer programs executing on their own computing devices. For example, an individual may access the media production platform 102 through a mobile application, desktop application, over-the-top (OTT) application, or web browser. Accordingly, the interfaces 104 may be viewed on personal computers, tablet computers, mobile phones, wearable electronic devices (e.g., watches or fitness accessories), network-connected ("smart") electronic devices (e.g., televisions or home assistant devices), gaming consoles, or virtual/augmented reality systems (e.g., head-mounted displays).

In some embodiments, at least some components of the media production platform 102 are hosted locally. That is, part of the media production platform 102 may reside on the computing device used to access the interfaces 104. For example, the media production platform 102 may be embodied as a desktop application executing on a personal computer. Note, however, that the desktop application may be communicatively connected to a network-accessible server system 108 on which other components of the media production platform 102 are hosted.

In other embodiments, the media production platform 102 is executed entirely by a cloud computing service operated by, for example, Amazon Web Services® (AWS), Google Cloud Platform™, or Microsoft Azure®. In such embodiments, the media production platform 102 may reside on a network-accessible server system 108 comprised of one or more computer servers. These computer servers can include media and other assets, such as digital signal processing algorithms (e.g., for processing, coding, or filtering digital signals), heuristics (e.g., rules for determining whether upsampling is necessary, rules for determining the appropriate sampling rate to which to upsample), and the like. Those skilled in the art will recognize that this information could also be distributed amongst a network-accessible server system and one or more computing devices. For example, media content may be stored on a personal computer that is used by an individual to access the interfaces 104 (or another computing device, such as a storage medium, that is accessible to the personal computer) while digital signal processing algorithms may be stored on a computer server that is accessible to the personal computer via a network.

As further discussed below, the media production platform 102 can facilitate upsampling of discrete audio signals. Generally, these discrete audio signals are obtained by the media production platform 102 in the form of audio files. Thus, an individual may be able to select an audio file and then specify the sampling rate to which the audio file should be upsampled. For example, the individual may be able to select an audio file that is representative of a recording of a speaker and then specify that the audio file should be upsampled to 44,100 Hz. Alternatively, upon receiving input indicative of a selection of an audio file, the media production platform 102 may upsample the audio file to progressively higher sampling rates until a quality threshold is reached.

The media production platform 102 may also be able to facilitate transcript-driven production of media content. An individual may be able to alter an audio file by modifying a corresponding transcript that is viewable through one of the interfaces 104, or vice versa. For example, if the individual inserts an audio file into a transcript, the media production platform 102 may cause the audio file to be added to the underlying audio file corresponding to the transcript.

Moreover, the media production platform 102 may be able to automatically modify media content on behalf of the individual. Thus, the media production platform 102 could create or modify a timeline that is associated with a media-based experience (also referred to as a "content-based experience") based on implicit actions or explicit actions of a person participating in the experience. This person may be referred to as a "consumer" of the content-based experience. As an example, the media production platform 102 may intelligently add, remove, or modify media content in a guided audio tour as a consumer progresses through the guided audio tour. Other examples of content-based experiences include audiobooks, presentations, radio segments, video segments, video games, and the like.

Figure 2:
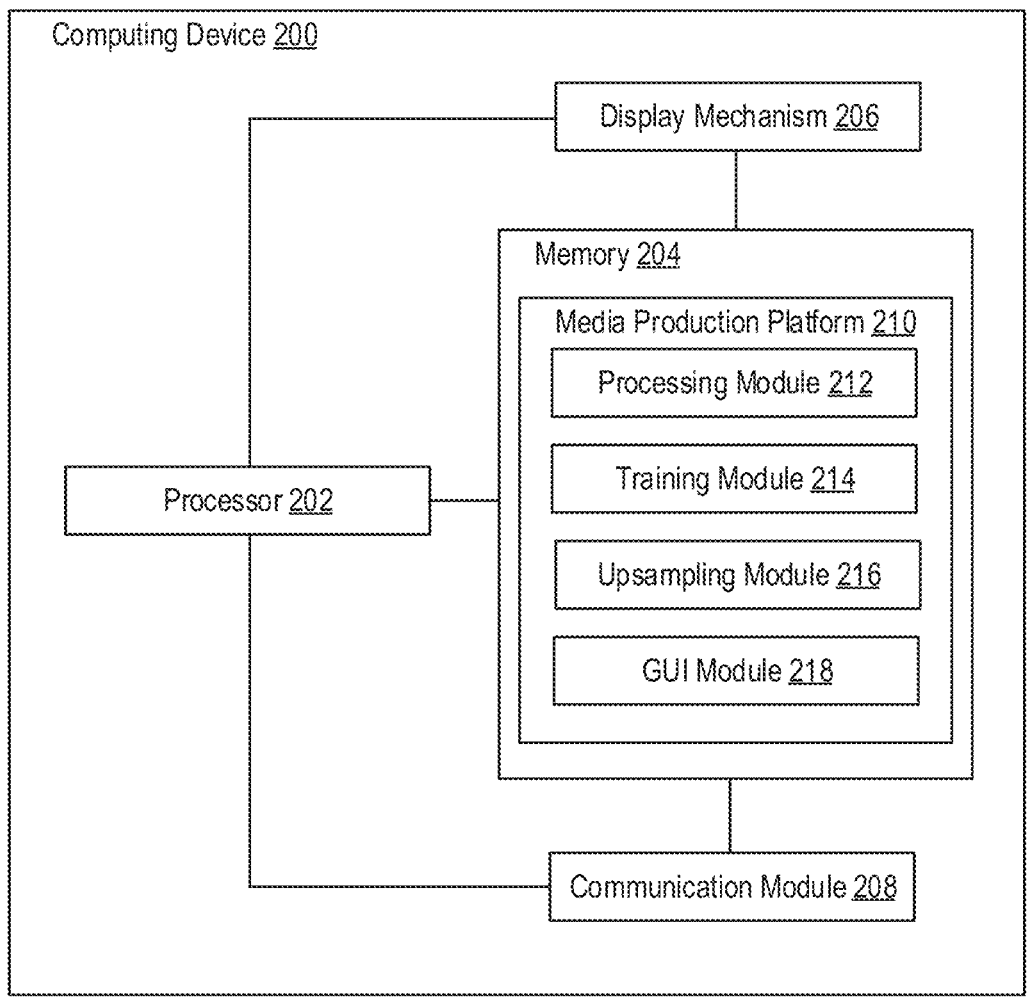
FIG. 2 illustrates an example of a computing device able to implement a media production platform through which individuals may be able to record, produce, deliver, or consume media content.

FIG. 2 illustrates an example of a computing device 200 able to implement a media production platform 210 through which individuals may be able to record, produce, deliver, or consume media content. For example, in some embodiments the media production platform 210 is designed to generate interfaces through which developers can generate or produce media content, while in other embodiments the media production platform 210 is designed to generate interfaces through which consumers can consume media content. In some embodiments, the media production platform 210 is embodied as a computer program that is executed by the computing device 200. In other embodiments, the media production platform 210 is embodied as a computer program that is executed by another computing device (e.g., a computer server) to which the computing device 200 is communicatively connected. In such embodiments, the computing device 200 may transmit relevant information, such as media content created, recorded, or otherwise acquired by the individual, to the other computing device for processing. Those skilled in the art will recognize that aspects of the computer program could also be distributed amongst multiple computing devices.

The computing device 200 can include a processor 202, memory 204, display mechanism 206, and communication module 208. The communication module 208 may be, for example, wireless communication circuitry designed to establish communication channels with other computing devices. Examples of wireless communication circuitry include integrated circuits (also referred to as "chips") configured for Bluetooth, Wi-Fi, NFC, and the like. The processor 202 can have generic characteristics similar to general-purpose processors, or the processor 202 may be an application-specific integrated circuit (ASIC) that provides control functions to the computing device 200. As shown in FIG. 2, the processor 202 can be coupled to all components of the computing device 200, either directly or indirectly, for communication purposes.

The memory 204 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 202, the memory 204 can also store data generated by the processor 202 (e.g., when executing the modules of the media production platform 210). Note that the memory 204 is merely an abstract representation of a storage environment. The memory 204 could be comprised of actual memory chips or modules.

The communication module 208 can manage communications between the components of the computing device 200. The communication module 208 can also manage communications with other computing devices. Examples of computing devices include mobile phones, tablet computers, personal computers, and network-accessible server systems comprised of computer server(s). For instance, in embodiments where the computing device 200 is associated with a developer, the communication module 208 may be communicatively connected to a network-accessible server system on which processing operations, heuristics, and algorithms for producing media content are stored. In some embodiments, the communication module 208 facilitates communication with one or more third-party services that are responsible for providing specified services (e.g., transcription). The communication module 208 may facilitate communication with these third-party services through the use of application programming interfaces (APIs), bulk data interfaces, etc.

For convenience, the media production platform 210 may be referred to as a computer program that resides within the memory 204. However, the media production platform 210 could be comprised of software, firmware, or hardware components implemented in, or accessible to, the computing device 200. In accordance with embodiments described herein, the media production platform 210 may include a processing module 212, training module 214, upsampling module 216, and graphical user interface (GUI) module 218. These modules may be an integral part of the media production platform 210. Alternatively, these modules may be logically separate from the media production platform 210 but operate "alongside" it. Together, these modules enable the media production platform 210 to generate and then support the interfaces through which an individual can create, record, edit, or consume media content.

The processing module 212 may be responsible for ensuring that data obtained (e.g., retrieved or generated) by the media production platform 210 is in a format suitable for the other modules. Thus, the processing module 212 may apply operations to alter media content obtained by the media production platform 210. For example, the processing module 212 may apply denoising, filtering, and/or compressing operations to media content obtained by the media production platform 210. As noted above, media content could be acquired from one or more sources. The processing module 212 may be responsible for ensuring that these data are in a compatible format, temporally aligned, etc.

As further discussed below, the training module 214 and upsampling module 216 may work in concert to train and then apply a model that is designed to upsample a first audio signal (also referred to as an "input audio signal") with a first sampling rate to a second sampling rate to produce a second audio signal (also referred to as an "output audio signal"). At a high level, the model is a machine learning framework that is comprised of one or more algorithms adapted to upsample an audio signal that is provided as input, thereby producing another audio signal having a different sampling rate. One example of a machine learning framework is a generative adversarial network (GAN) that is comprised of one or more artificial neural networks (or simply "neural networks"). The term "neural network" refers to a collection of algorithms that learns by processing examples, each of which contains a known input and output, to form probability-weighted associations between those elements. Neural networks can "learn" how to produce an appropriate output given an input without being manually programmed with rules.

Assume, for example, that the media production platform 210 acquires input indicative of a selection of an audio file to be upsampled. Generally, the audio file will be in the form of a discrete audio signal with a frequency less than 40,000 Hz. For example, the discrete audio signal may have a sampling rate of 8,000 Hz, 16,000 Hz, 22,050 Hz, or 24,000 Hz depending on the computing device used for recording.

In such a scenario, the upsampling module 216 can apply a Fourier transform (e.g., an STFT) to the audio file to produce a first magnitude spectrum. Then, the upsampling module 216 can apply a model to the first magnitude spectrogram to produce a second magnitude spectrogram that corresponds to a higher sampling rate. One example of a model is a Super Resolution GAN (SRGAN) that is trained by the training module 214. Thereafter, the upsampling module 216 can apply an inverse Fourier transform (e.g., an ISTFT) to the second magnitude spectrogram to create a second audio file.

As mentioned above, the training module 214 may be responsible for training the models that are applied by the upsampling module 216. The training module 214 may train and then manage a series of models associated with different sampling rates. For example, the training module 214 may train a model to generate magnitude spectrograms corresponding to a sampling rate of 44,100 Hz, a model to generate magnitude spectrograms corresponding to a sampling rate of 60,000 Hz, a model to generate magnitude spectrograms corresponding to a sampling rate of 66,000 Hz, etc. Thus, the training module 214 may train one or more models to produce magnitude spectrograms at different sampling rates over 40,000 Hz. These models can be stored in a library, and the appropriate model can be selected from the library based on the desired sampling rate of the output audio signal.

The GUI module 218 may be responsible for generating the interfaces through which individuals can interact with the media production platform 210. As shown in FIGS. 3A-G, these interfaces may include visual indicia representative of the audio files that make up a media-based experience, or these interfaces may include a transcript that can be edited to globally effect changes to a media-based experience. For example, if an individual deletes a segment of a transcript that is visible on an interface, the media production platform 210 may automatically delete a corresponding segment of audio content from an audio file associated with the transcript.

FIGS. 3A-G depict examples of interfaces that enable an individual to readily produce high-quality media content. These interfaces, which are created by a media production platform, may enable nearly anyone who understands how to use a word processor to produce media content that is suitable for professional applications.

Moreover, the media production platform can support powerful features that can be used to create media content, incorporate consumer feedback, and ensure these interfaces are readily comprehensible and easy to use. Examples of media content include location-based experiences involving audio content and/or video content, podcasts, audiobooks, radio segments, television segments, presentations, etc. These powerful features are enabled by higher-level, content-based editing tools rather than the lower-level, waveform-based editing tools used by conventional digital audio workstations (DAWs). The media production platform may also be designed to facilitate simultaneous collaboration between multiple developers, as well as multiple consumers who may simultaneously consume media content produced by those developers.

Figure 3A:
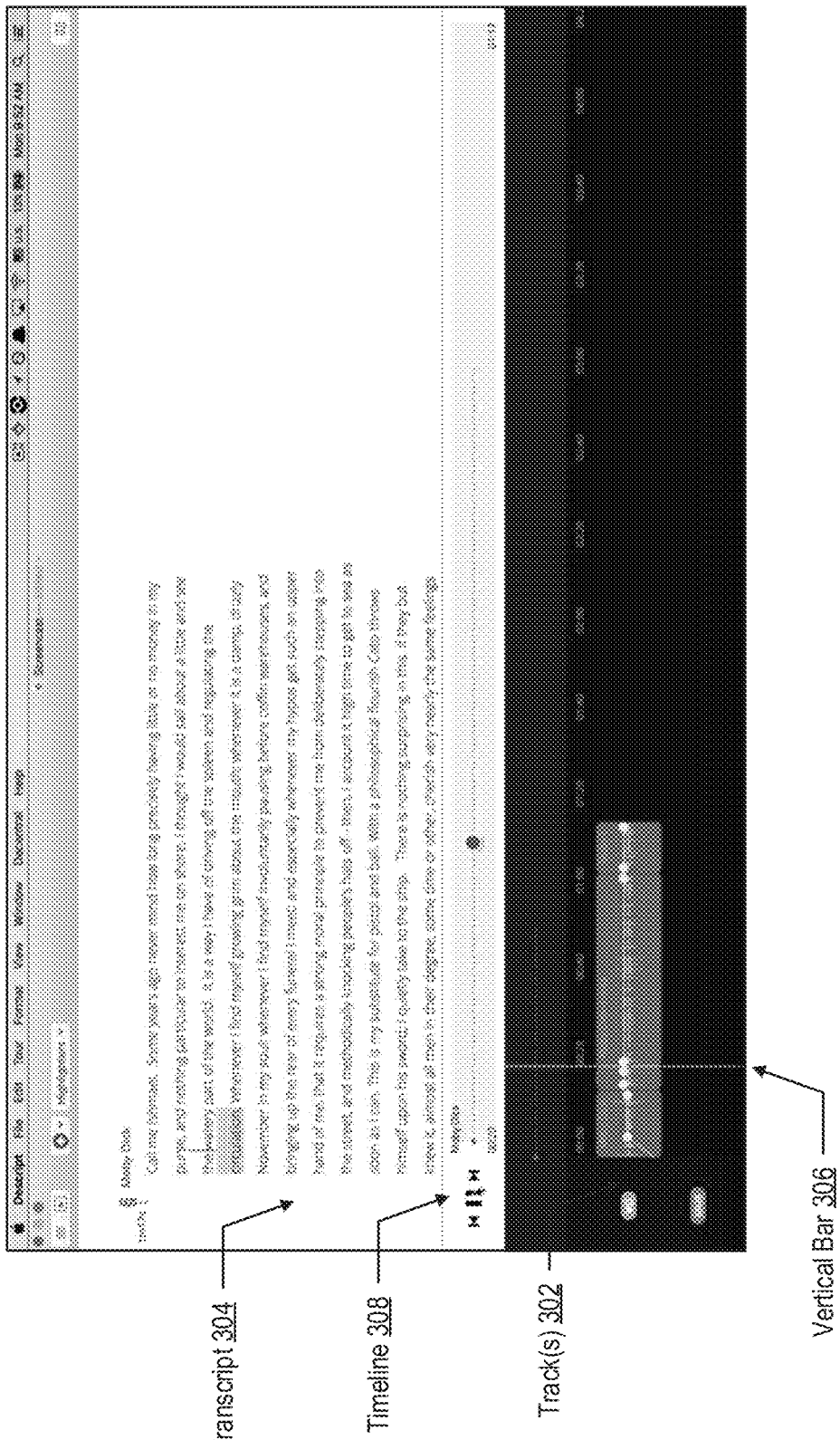
FIG. 3A depicts an example of an interface that includes multiple windows for producing media content.

As shown in FIG. 3A, an interface may include multiple windows for producing media content. Production may involve creating and/or editing media content. For example, one or more tracks 302 corresponding to audio file(s) could be presented in one window, while a transcript 304 of words recognized in the audio file(s) could be presented in another window. The track(s) 302 may be separately or collectively editable. The media production platform may also be able to intelligently switch between multiple tracks based on whether certain criteria are satisfied, much like a video game engine. For example, the media production platform may determine whether certain condition(s) are met for playing a particular audio file. As another example, the media production platform may determine whether an individual has begun editing a portion of the transcript corresponding to a particular audio file.

Interfaces with multiple windows can easily align media content for post-processing, editing, etc. Alignment can also be permitted between media content of different formats (e.g., audio and text). For example, when an individual modifies a transcript (e.g., by copying a segment of a transcript and pasting it to a different location), the media production platform may cause the change to be reflected globally. That is, the media production platform may effect an identical or similar modification to an audio file associated with the transcript. Such action may be performed periodically or continually. For example, the media production platform may continually monitor the transcript (or the corresponding audio file) for changes so long as available bandwidth and/or connectivity status meets a specified threshold. Should these measure(s) fall below the specified threshold, the media production platform may periodically query whether any modifications have been made to the transcript (or the corresponding audio file).

In some embodiments, visual cues are used to indicate the current position in the transcript 304 and/or the track(s) 302. Here, for example, the media production platform has highlighted the word corresponding to the current position in the transcript and created a vertical bar 306 that overlays the track(s) 302. Other examples of visual cues include underlining the word corresponding to the current position, changing the color of the word corresponding to the current position, and placing an animated feature (e.g., a moving sphere) near the word corresponding to the current position. A timeline 308 may indicate the total duration of the media content, as well as provide a visual representation of progress.

Figure 3B:
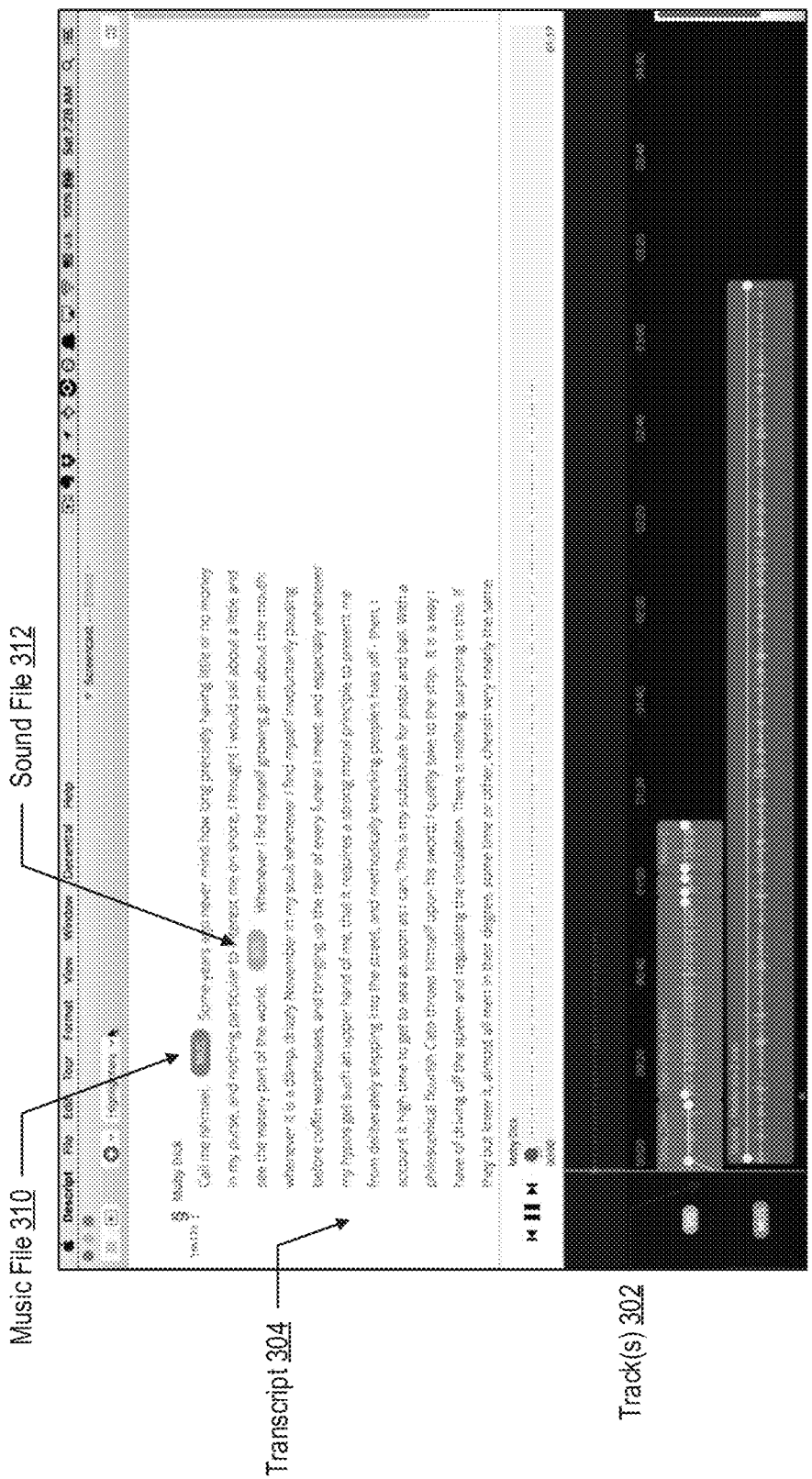
FIG. 3B depicts an example of an interface that may facilitate in-line, multi-track sequencing of the content within windows shown on the interface.

As shown in FIG. 3B, an interface may also facilitate in-line, multi-track sequencing of the media content in the windows shown on the interface. In some embodiments, all of the windows on the interface are dynamically linked together (e.g., on a phoneme level or a word level). In other embodiments, only some of the windows on the interface are dynamically linked together. Various mechanisms, such as a drag-and-drop mechanism, may allow audio files to be selected/placed directly where an individual would like the sound to play. Here, for example, a music file 310 has been placed in the transcript 304 such that the music will begin playing after the word "Ishmael" has been uttered. Similarly, a sound file 312 has been placed in the transcript 304 such that the sound effect will begin playing after the word "world" has been uttered.

After an audio file has been placed in the transcript 304, a waveform corresponding to the audio file may be automatically placed along one of the track(s) 302 in the waveform window. When the audio file is moved within the transcript 304 (e.g., due to being dragged from one location to another location), the media production platform can ensure that the corresponding waveform moves along the track as well. As noted above, the transcript 304 and the audio file(s) arranged along the track(s) 302 are normally synced with one another so that changes made to one can be propagated across the other by the media production platform in real time.

An individual may be able to separately edit the audio file(s) arranged along the track(s) 302 from within the waveform window. For example, the individual may be able to modify the duration of an audio file (e.g., by cutting material), set fades, and perform other operations without leaving the interface.

Figure 3C:
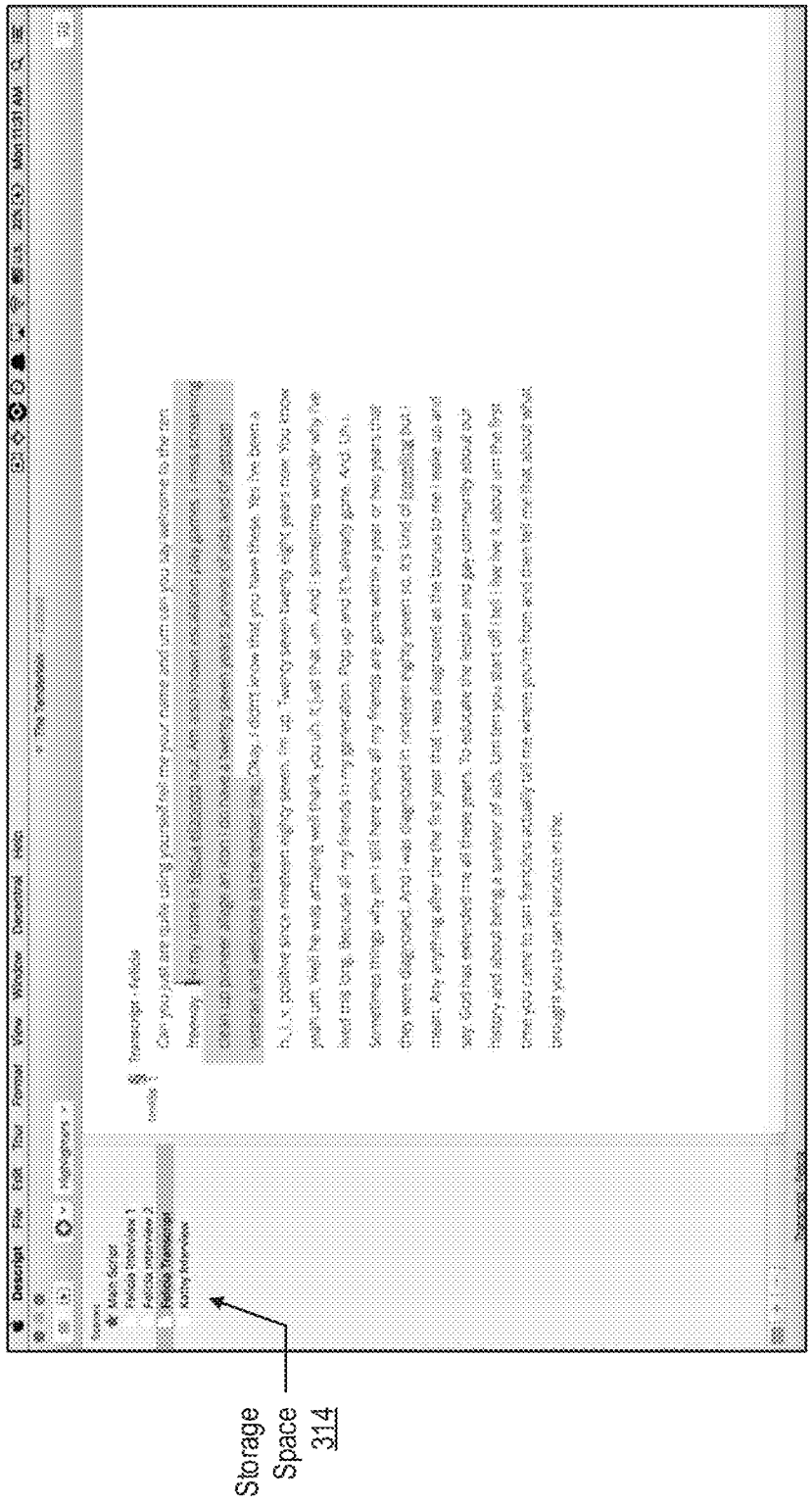
FIG. 3C illustrates how files can be stored as separate documents in a storage space.

As shown in FIG. 3C, files can be stored as separate documents within a storage space 314 (also referred to as a "workspace"). Examples of files include text files (e.g., transcripts), audio files (e.g., voiceover recordings), and video files. In some embodiments, the storage space 314 is associated with a particular project/experience. Accordingly, only those files related to the particular project/experience may be shown within the storage space 314. Here, for example, four separate files (i.e., Felicia Interview 1, Felicia Interview 2, Felicia Transcript, and Kathy Interview) are associated with a single project, namely, a guided audio tour of the Tenderloin neighborhood of San Francisco, California. The four separate files include three audio files (i.e., Felicia Interview 1, Felicia Interview 2, and Kathy Interview) and one text file (i.e., Felicia Transcript).

An individual could manually associate an audio file with a preexisting transcript when the audio file is uploaded to the media production platform. Alternatively, the media production platform could automatically associate an audio file with a preexisting transcript based on, for example, a comparison of words recognized in the audio file to a series of preexisting transcripts. As noted above, the media production platform may automatically generate a transcript responsive to receiving the audio file and then post the transcript to the interface for review by the individual. For example, the media production platform may create a transcript upon determining that a transcript does not already exist for an acquired audio file. If a transcript is uploaded to the media production platform (or written using the interface) and no corresponding audio file(s) exist, the media production platform may automatically generate voice-like scratch audio that can be used to test aspects of a project/experience, such as expected runtime, flow, etc.

Figure 3D:
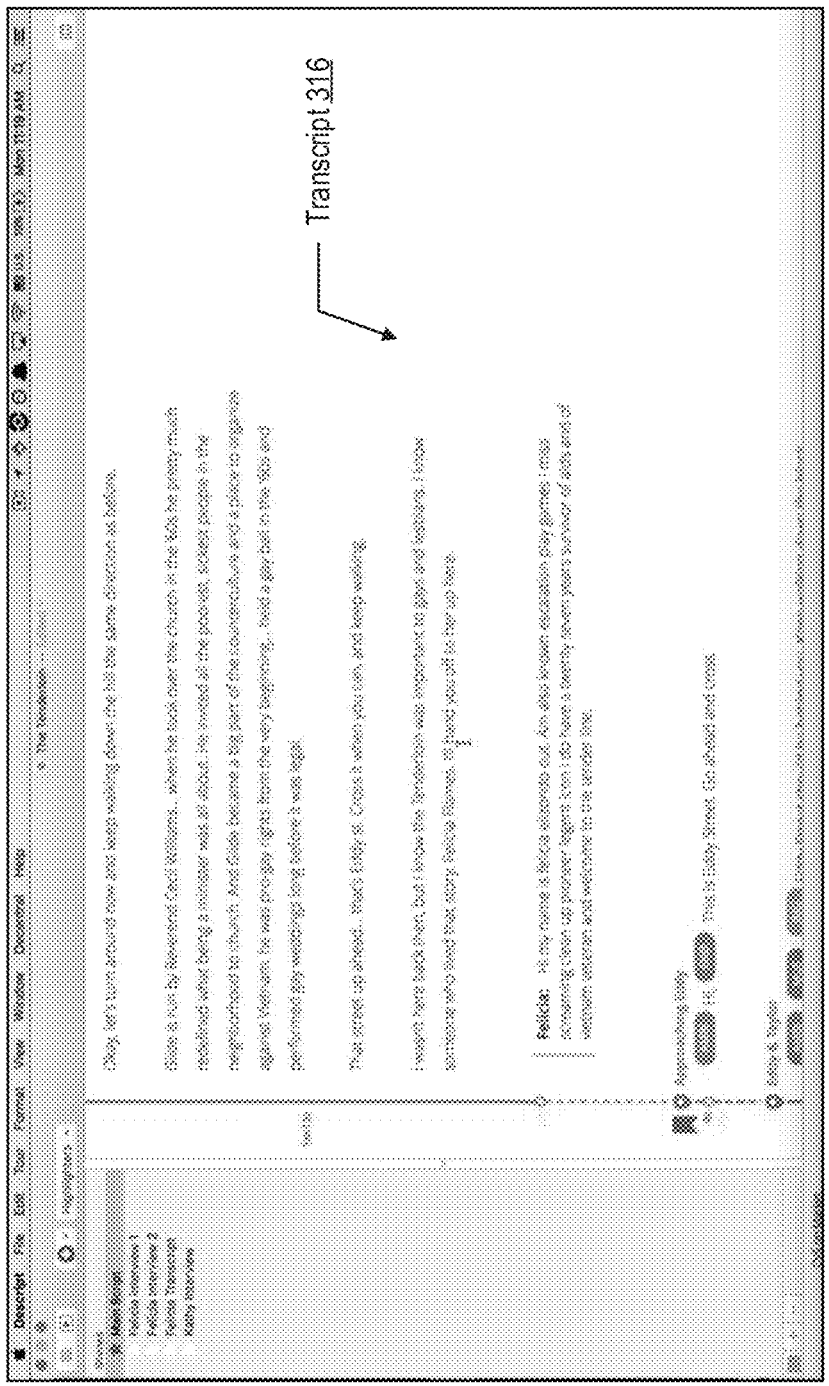
FIG. 3D illustrates how an individual can select a segment of a transcript for the purpose of altering the corresponding audio waveform.
Figure 3E:
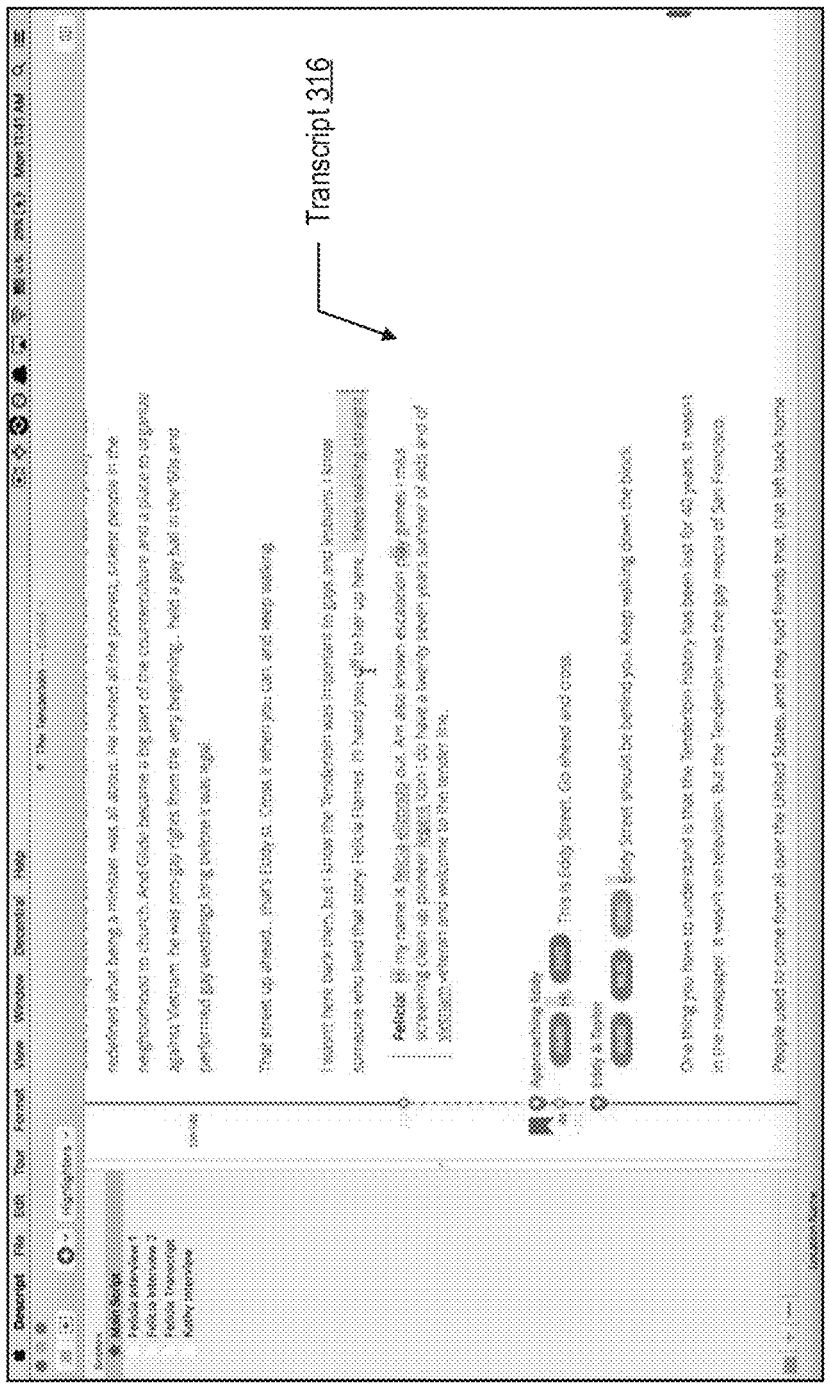
FIG. 3E illustrates how an individual can copy a segment of a transcript and then paste the copied segment into another transcript, another location in the transcript, etc.

Each file accessible to the media production platform may be independently editable using the interfaces shown in FIGS. 3A-G. However, an individual may also be able to easily switch between various files while producing a project/experience. As shown in FIGS. 3D-E, the individual could select a segment of a transcript 316 (e.g., by selecting a portion of the transcript 316 or the corresponding audio waveform), copy the segment, and then paste the segment into another transcript, another location in the transcript 316, etc.

Corresponding media content may also be transferred based on the single action performed by the individual. For example, the selection of the segment of the transcript 316 may prompt the media production platform to create an audio segment by clipping a source audio file. If the individual copies segments of a first transcript and then pastes the segments into a second transcript, corresponding portions of a first audio file associated with the first transcript may be used to form a second audio file associated with the second transcript.

Such granular modification of the text/audio is enabled by precisely aligning the transcript and corresponding audio file(s). Alignment may occur during pre-processing of the audio file(s), generating of the transcript, etc. When an audio file is provided to the media production platform (e.g., by uploading the audio file through the interface), various speech recognition processes can be performed that enable words spoken in the audio file to be converted into text.

Accordingly, the media production platform may be able to automatically align audio file(s) uploaded by an individual with a preexisting transcript by detecting the presence of certain words/phrases. These words/phrases may be referred to as "keywords" or "keyphrases" as they enable alignment to be accomplished much more easily. In some embodiments, the media production platform is able to automatically stack multiple utterances of the same phrase upon detecting a single occurrence of the phrase in the preexisting transcript. That is, a speaker may be able to record one or more takes over a preexisting script. Multiple occurrences of the same phrase are often indicative of multiple takes of the same line of dialogue by a voice actor. The media production platform may be configured to facilitate the initiation of playback of the multiple takes, the selection of a given take, etc.

The media production platform can create a transcript based on the spoken words recognized in an audio file. Moreover, the media production platform can parse the recognized words and align the words with the corresponding portions of the audio file on a phoneme level or a word level. Consequently, audio waveforms can be readily modified by the media production platform based on changes to the transcript, and vice versa. Note, however, that even if the transcript is not identical to the audio file (e.g., the transcript includes errors, or the speaker has not uttered words in the transcript), alignment can still be performed to determine a best fit for the audio file within the transcript based on context.

Figure 3F:
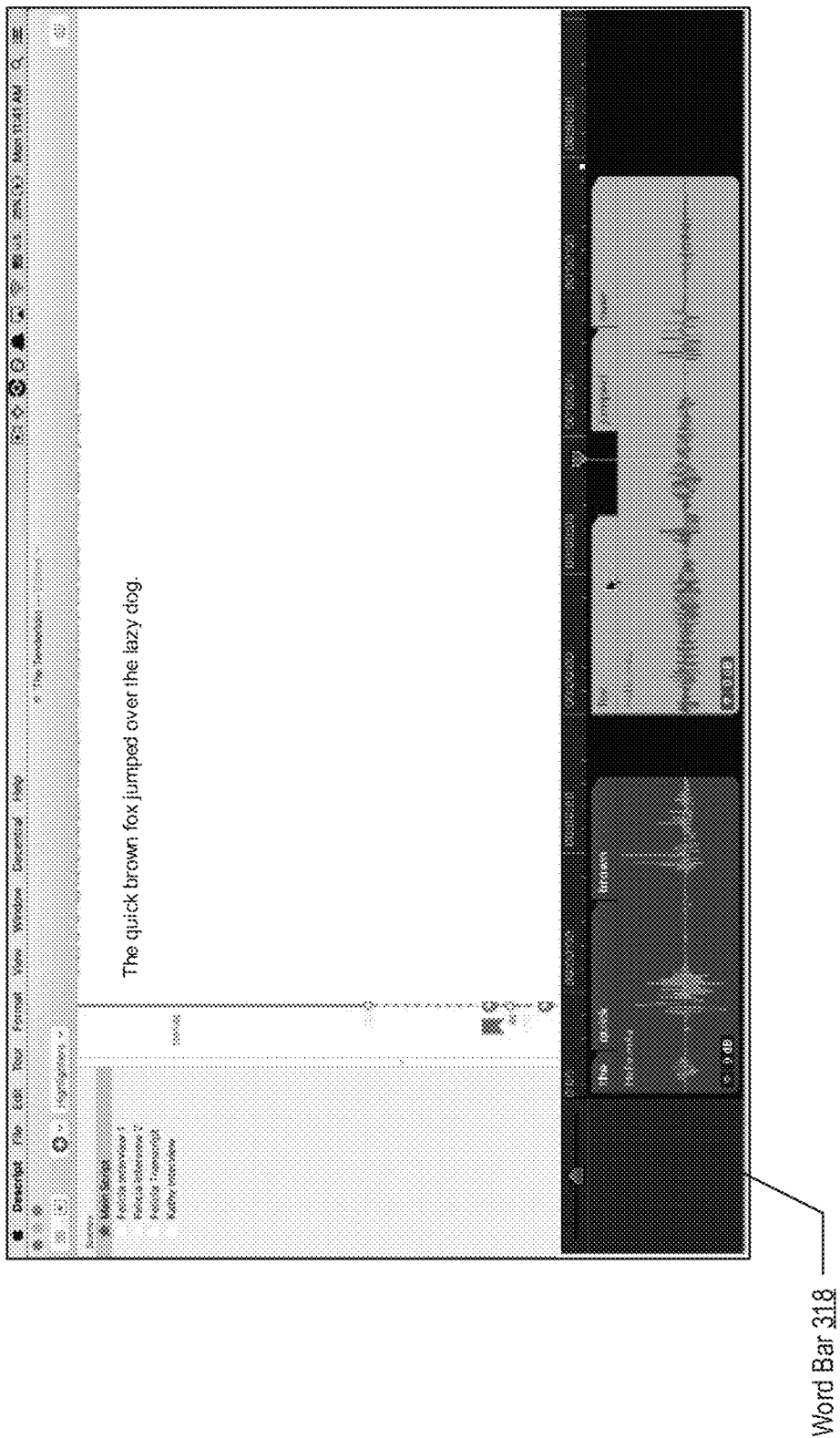
FIG. 3F depicts an example of an interface that includes a word bar, which allows an individual to directly manipulate words via a waveform editor window.

As shown in FIG. 3E, individuals may be able to modify the transcript 316 directly. Here, an individual has added text ("Keep walking straight.") directly into the transcript 316. In some embodiments, modifications to the transcript 316 are visually highlighted in some manner. For example, newly added text may be highlighted in a particular color to indicate that audio must still be recorded for that text. In such instances, if the individual elects to play the transcript (e.g., for testing purposes), a voice generator program may read the newly added text so as to not interrupt the flow of the media-based experience. Examples of modifications include additions of new text, removals of existing text, and changes to existing text. As shown in FIG. 3F, some interfaces include a word bar 318 that visually represents the individual words in an audio file. The media production platform may automatically populate the word bar 318 after parsing the audio file to recognize spoken words. Each word in the word bar 318 may be aligned with a corresponding portion of an audio waveform corresponding to the audio file and/or a timeline. Individuals may be able to directly manipulate the audio file by manipulating the word(s) in the word bar 318, eliminate gaps in the audio file by manipulating the audio waveform, create gaps in the audio file by manipulating the audio waveform, etc.

Multiple voices that are simultaneously speaking in an audio file (or a video file) may be separately shown using script section blocks. Such a scenario may be referred to as "crosstalk."

Figure 3G:
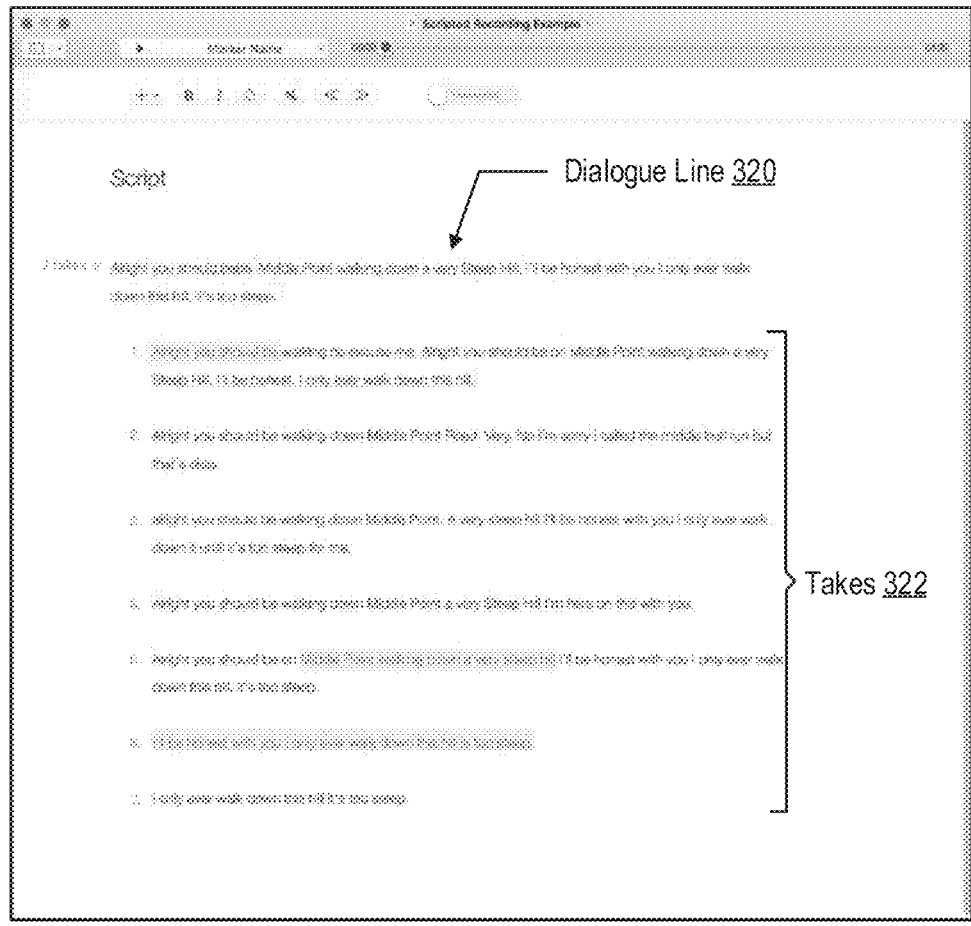
FIG. 3G illustrates how multiple takes of the same line of dialogue may be separately shown and numbered.

As shown in FIG. 3G, multiple takes of the same line of dialogue may be displayed in a similar manner. Here, for example, there are seven different takes 322 of a line of dialogue 320. These takes 322 are contemporaneous in nature. That is, all of the takes occur at the same point in time during a media-based experience. Accordingly, a consumer of the media-based experience will likely only experience a single take. However, developers may want to see how the different takes affect flow, runtime, etc.

Playhead(s) may be used to represent position while producing, reviewing, or viewing media content. For example, in some embodiments, multiple playheads are used for those takes that share words/phrases in common. While playheads are normally illustrated as vertical lines embedded within the text, other visual indicia may be used. For example, words may be highlighted in a particular color as they are presented during playback of a take by the media production platform.

Overview of Approaches to Upsamplinq Audio Signals

As discussed above, an individual may access a media production platform in order to produce a media compilation from one or more discrete audio signals. These discrete audio signals may be of insufficient quality due to low sampling rates, however. One option for improving the quality of these discrete audio signals is upsampling. Accurately upsampling in a resource-efficient manner is difficult, however, especially for discrete audio signals that include human voices. Simply put, attempts at upsampling discrete audio signals that include human voices have historically resulted in outputs that do not reflect how the speakers actually sound.

Introduced here are computer programs and associated computer-implemented techniques for upsampling discrete audio signals to higher sampling rates. When a discrete audio signal is obtained by a media production platform, the discrete audio signal can be upsampled to improve the quality. The approach to upsampling described herein can be used to increase the quality of discrete audio signals recordings (e.g., of conversations, dialogue, or music), as well as improve the accuracy of downstream processes, such as speech-to-text (STT) conversion, that rely on those discrete audio signals. Moreover, the approaches described herein ensure that the upsampled discrete audio signal is largely or entirely indistinguishable from the continuous audio signal from which the original discrete audio signal is derived. The term "discrete audio signal" may refer to any signal obtained by sampling a continuous audio signal at uniformly spaced times in accordance with a sampling rate. The nature of the continuous audio signal is not important. Thus, the discrete and continuous audio signals may include speaking or singing of one or more individuals.

The approach includes two phases, each of which is discussed below. First, the media production platform trains a model using one or more samples corresponding to a particular sampling rate. As an example, if the media production platform is interested in generating a model to facilitate upsampling of discrete audio signals to 44,100 Hz, then samples with sampling rates of 44,100 Hz can be provided to the model as training data. The term "sample," as used herein, may refer to a discrete audio signal that is used by a model to learn the characteristics of discrete audio signals at a given sampling rate. Second, the media production platform can then apply the model to facilitate upsampling of a discrete audio signal. These stages do not need to be performed one after the other, however. Training (i.e., the first stage) may be performed hours, days, or weeks before upsampling (i.e., the second stage) occurs.

A. Training Models Associated with Different Sampling Rates

Figure 4:
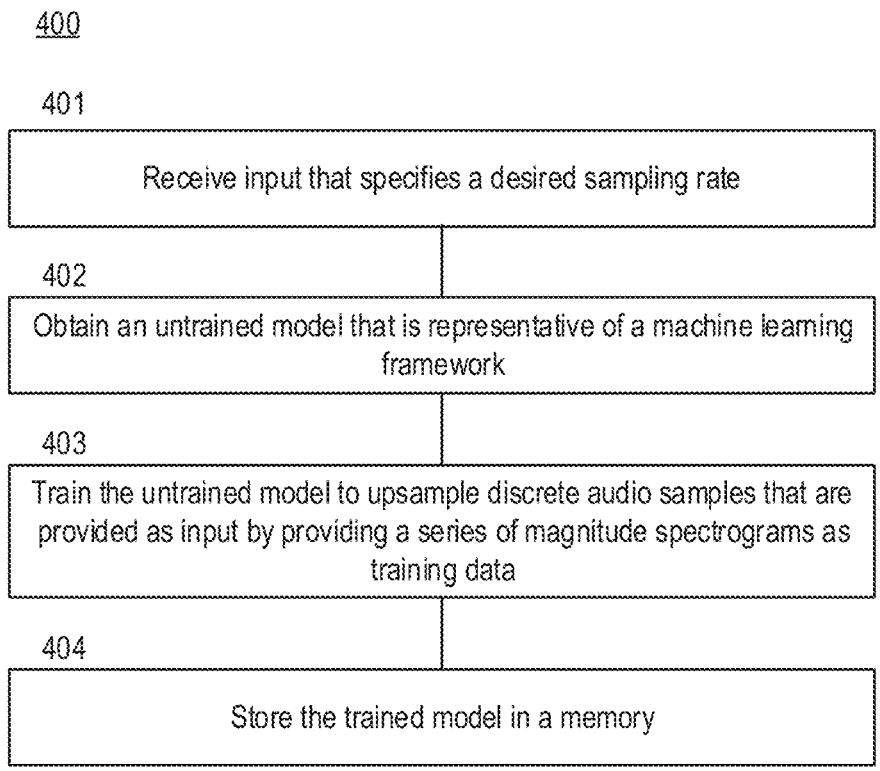
FIG. 4 depicts a flow diagram of a process for training a model that is to be used to upsample discrete audio signals.

FIG. 4 depicts a flow diagram of a process 400 for training a model that is to be used to upsample discrete audio signals. Initially, a media production platform may receive input that specifies a desired sampling rate (step 401). For example, the media production platform may generate an interface through which an individual is able to specify the desired sampling rate. As another example, the media production platform may be programmed to examine a primary database that includes a series of trained models, each of which is associated with a different sampling rate, so as to determine whether a trained model already exists in the primary database for the desired sampling rate. The primary database may be one of multiple databases that are accessible to the media production platform. For example, the media production platform may manage the primary database in which trained models are stored, and the media production platform may be able to access one or more other databases (also referred to as "secondary databases") in which magnitude spectrograms, discrete audio signals, and other information are stored.

Then, the media production platform can obtain an untrained model that is representative of a machine learning framework (step 402). The model may be, for example, a GAN that is comprised of one or more neural networks that, when trained, generate an output given an input based on characteristics learned during training. For instance, as further discussed below, the model can be trained to produce a magnitude spectrogram at a desired sampling rate (e.g., 44,100 Hz) responsive to another magnitude spectrogram at another sampling rate (e.g., 16,000 Hz or 22,050 Hz) being provided as input.

Then, the media production platform can train the model to upsample discrete audio samples that are provided as input by providing a series of magnitude spectrograms as training data during a training phase (step 403). Each magnitude spectrogram may be associated with a different discrete audio signal, though all of the magnitude spectrograms may be associated with the same sampling rate. For example, if the model is to be trained to facilitate upsampling of discrete audio signals to 44,100 Hz, then the series of magnitude spectrograms may be associated with a series of discrete audio signals with sampling rates of 44,100 Hz. During this training phase, the model learns the characteristics of magnitude spectrograms (and thus the corresponding discrete audio signals) at the desired sampling rate. These characteristics can be used to transform a magnitude spectrogram at one sampling rate into a magnitude spectrogram at the desired sampling rate.

Generally, models are trained to upsample from a first fixed sampling rate to a second fixed sampling rate. As an example, a model may be trained to take, as input, magnitude spectrograms associated with discrete audio signals with sampling rates of 22,050 Hz and then produce, as output, magnitude spectrograms corresponding to 44,100 Hz. Said another way, the model may be trained to facilitate upsampling from 22,050 Hz to 44,100 Hz. As further discussed below, the media production platform may maintain a primary database of models trained to facilitate upsampling between different sampling rates. For instance, the primary database may include a first model trained to facilitate upsampling from Sampling Rate A (e.g., 22,050 Hz) to Sampling Rate B (e.g., 44,100 Hz), a second model trained to facilitate upsampling from Sampling Rate C (e.g., 16,000 Hz) to Sampling Rate B (e.g., 44,100 Hz), a third model trained to facilitate upsampling from Sampling Rate C (e.g., 16,000 Hz) to Sampling Rate D (e.g., 48,000 Hz), etc. The media production platform may be able to identify the appropriate model from the primary database based on an analysis of the discrete audio signals (or corresponding magnitude spectrograms) to be upsampled. Alternatively, more than one of these models could be combined into a superset model that can be directly applied by the media production platform.

The series of magnitude spectrograms that are provided as training data may be acquired by the media production platform in several different ways. In some embodiments, the media production platform may receive another input that is indicative of a selection of the series of magnitude spectrograms made through an interface that is generated by the media production platform. Upon receiving this input, the media production platform can retrieve the series of magnitude spectrograms from a secondary database. This secondary database may be associated with a media compilation (also referred to as a "project"), an enterprise, or an individual. In other embodiments, the media production platform may receive another input that is indicative of a selection of a series of discrete audio signals. In such embodiments, the media production platform may retrieve the series of discrete audio signals from a secondary database and then apply a transform (e.g., a Fourier transform) to each of the series of audio signals to produce the series of magnitude spectrograms.

Thereafter, the media production platform can store the trained model in the primary database (step 404). As noted above, the primary database may include a series of trained models, each of which is associated with a different sampling rate. Trained models may be stored in the primary database in preparation for future use. When the media production platform determines that upsampling is necessary, the appropriate trained model can be selected from the primary database based on the sampling rate to which the discrete audio signal of interest is to be upsampled. Thus, the primary database may be queryable by the media production platform sampling rate. Additionally or alternatively, the media production platform may be configured to generate an interface through which an individual can browse or search the primary database.

Over time, the media production platform may update the primary database that includes models corresponding to different sampling rates. For example, if the media production platform determines (e.g., based on input indicative of a request from a user) that upsampling is desired to a new sampling rate for which a model does not already exist, then the media production platform can train the model using appropriate training data and then store the newly trained model in the primary database.

FIG. 5 depicts a flow diagram of another process 500 for training a model that is to be used to upsample discrete audio signals. Initially, a media production platform receives input that specifies a desired sampling rate (step 501). Step 501 of FIG. 5 may be substantially similar to step 401 of FIG. 4. The media production platform can then examine a primary database (also referred to as a "first database") that includes trained models associated with different sampling rates (step 502). As noted above, these trained models may be, for example, GANs. If the media production platform determines that none of the trained models included in the primary database are associated with the desired sampling rate (step 503), then the media production platform can initiate the training phase.

During the training phase, the media production platform trains a model to learn the characteristics of magnitude spectrograms that are associated with the desired sampling rate. Thus, the media production platform may initially obtain multiple magnitude spectrograms that are associated with the desired sampling rate (step 504). For example, the media production platform may acquire multiple discrete audio signals from a secondary database and then apply a transform to each discrete audio signal to produce the multiple magnitude spectrograms that are to be provided as training data. Alternatively, the media production platform may simply acquire the multiple magnitude spectrograms to be provided as training data. The multiple magnitude spectrograms may be automatically obtained by the media production platform responsive to, for example, a determination that the discrete audio signals or magnitude spectrograms correspond to a sampling rate of interest. Alternatively, an individual may be permitted to select the discrete audio signals or magnitude spectrograms through an interface that is generated by the media production platform. Then, the media production platform can provide the multiple magnitude spectrograms to an untrained model as training data (step 505).

After training is completed, the media production platform can store the trained model in the primary database (step 506). The primary database may be accessible to a single user of the media production platform, or the primary database may be accessible to multiple users of the media production platform. For example, the trained models in the primary database may be accessible to multiple individuals or enterprises that are subscribers to a service offered or supported by the media production platform. The primary database may be located in the memory of the computing device on which the media production platform is executing. In some embodiments, the media production platform populates a data structure with information so as to programmatically associate the trained model with the desired sampling rate (step 507). This data structure may be stored in a secondary database that is also located in the memory. At a high level, the secondary database may include information summarizing the contents of the primary database. As such, the secondary database may enable the media production platform to readily determine whether trained models are available for sampling rates of interest.

Training may involve unsupervised learning, semi-supervised learning, or fully supervised learning. For example, an individual may specify the desired sampling rate for which the model is to be trained and then identify the series of magnitude spectrograms (or the corresponding series of discrete audio signals) that are to be used for training. Alternatively, the media production platform may train the model responsive to determining that a model does not already exist in the primary database for a sampling rate specified by an individual. Thus, the media production platform may be able to train models for various sampling rates.

These steps may be performed in various sequences and combinations. For example, as mentioned above, in some embodiments the media production platform may simply acquire the magnitude spectrograms to be used for training, while in other embodiments the media production platform may need to produce the magnitude spectrograms to be used for training. Thus, the media production platform may identify one or more discrete audio signals to be used for training and then produce a magnitude spectrogram for each of those discrete audio signals. As another example, the training phase could be performed iteratively as additional magnitude spectrograms or discrete audio signals are identified. Upon receiving input indicative of a request to further train a model, the media production platform may provide one or more magnitude spectrograms as additional training data. These magnitude spectrograms may be specified in the input, or these magnitude spectrograms may be acquired (e.g., generated or retrieved) by the media production platform.

Other steps may also be performed in some embodiments. For example, the media production platform may be able to cause transmission of a notification to a computing device that specifies the model has been trained. The computing device may be associated with an individual who indicated an interest in employing the trained model while producing a media compilation, or the computing device may be associated with an individual who is responsible for managing the media production platform. As another example, in embodiments where an individual manages or supervises the training phase via an interface generated by the media production platform, the media production platform may post notifications to the interface that indicate whether training is complete.

B. Applying Models to Facilitate Upsampling

Several processes for upsampling discrete audio signals from one sampling rate to another sampling rate are described below. These processes may be described in the context of specific sampling rates. For example, a process may be described in the context of converting a first discrete audio signal with a sampling rate of 22,050 Hz into a second discrete audio signal with a sampling rate of 44,100 Hz. However, those skilled in the art will recognize that these values have been provided solely for the purpose of illustration. These processes may be applicable to any scenario in which a discrete audio signal is to be upsampled to a higher sampling rate.

Figure 6:
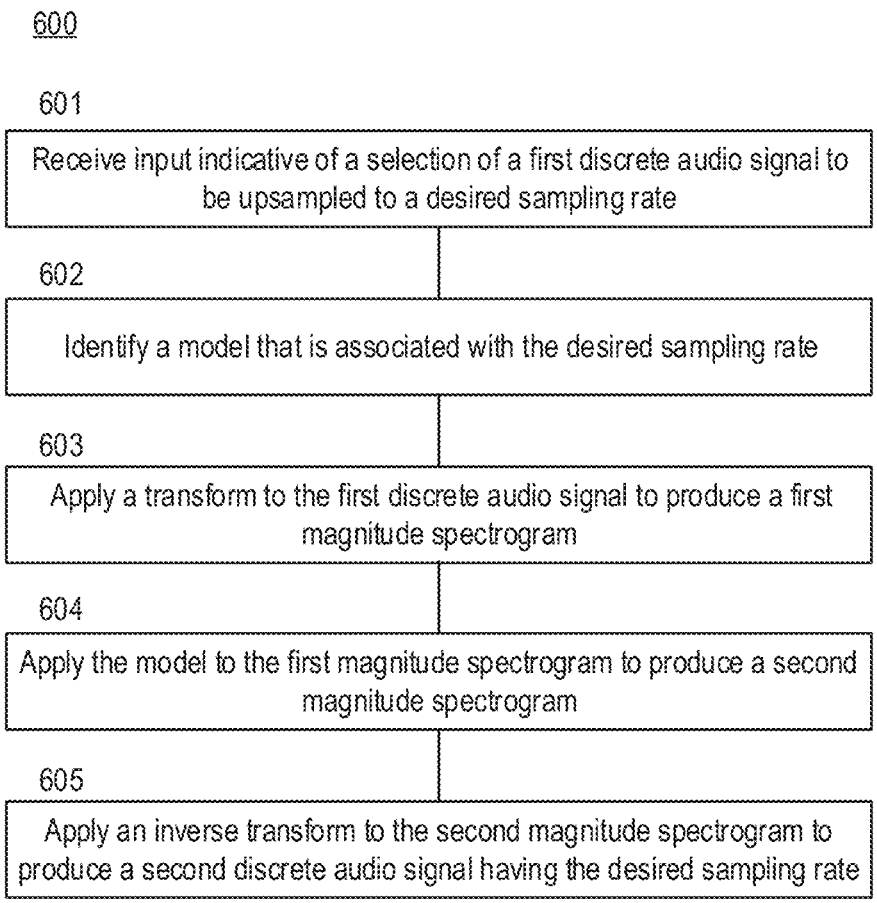
FIG. 6 depicts a flow diagram of a process in which a discrete audio signal is upsampled using a model.

FIG. 6 depicts a flow diagram of a process 600 in which a discrete audio signal is upsampled using a model. As discussed above with reference to FIGS. 4-5, the model may be trained to upsample discrete audio samples to a given sampling rate. Initially, a media production platform may receive input indicative of a selection of a first discrete audio signal to be upsampled to a desired sampling rate (step 601). As an example, an individual may interface with the media production platform through an interface as discussed above with reference to FIGS. 1-3G. Through the interface, the individual may select the first discrete audio signal responsive to determining that it will be used in the production of a media compilation. In some embodiments, the media production platform receives another input that specifies the desired sampling rate to which the first discrete audio signal is to be upsampled. This input may also be provided through the interface by the individual.

Alternatively, the media production platform may determine the desired sampling rate based on the desired quality of the media compilation, the contents of the first discrete audio signal, or the channel on which the media compilation is to be played. For example, the media production platform may be programmed to upsample discrete audio signals that include music or singing to higher sampling rates than discrete audio signals that include spoken dialogue. As another example, upon determining that the first discrete audio signal is to be included in a media compilation, the media production platform may determine whether a quality threshold has been specified or defined for the media compilation. In such a scenario, the media production platform may upsample the first discrete audio signal until the quality threshold is reached.

Thus, the media production platform may automatically upsample discrete audio signals to the desired sampling rate. As an example, the media production platform may upsample all discrete audio signals that are obtained by (e.g., uploaded to or retrieved by) the media production platform. As another example, the media production platform may upsample all discrete audio signals that have been added to a media compilation. For instance, upon determining that a discrete audio signal has been selected for inclusion in a media compilation (e.g., by an individual via the interfaces shown in FIGS. 3A-G), the media production platform may determine whether the sampling rate of the discrete audio signal exceeds a threshold and, if not, upsample the discrete audio signal accordingly.

In some embodiments, the desired sampling rate is programmed into the media production platform before the production process described with reference to FIGS. 3A-G begins. For example, the individual may specify a preference that all discrete audio signals should be upsampled to the desired sampling rate. As another example, the media production platform may have a rule that all discrete audio signals should be upsampled to the desired sampling rate. Note that, in such embodiments, the individual may be permitted to override the programming, for example, by specifying that a discrete audio signal should be upsampled to a different sampling rate.

Then, the media production platform can identify a model that is associated with the desired sampling rate (step 602). As discussed above with reference to FIGS. 4-5, the model can be trained to produce magnitude spectrograms at the desired sampling rate.

The media production platform can then apply a transform to the first discrete audio signal to produce a first magnitude spectrogram (step 603). The transform may be a Fourier transform (e.g., an STFT) that decomposes the first discrete audio signal from the time domain into the frequency domain. The media production platform can then apply the model to the first magnitude spectrogram to produce a second magnitude spectrogram (step 604). Said another way, the media production platform can provide the first magnitude spectrogram to the model as input so as to obtain the second magnitude spectrogram, which is produced by the model as output. While the first magnitude spectrogram corresponds to the sampling rate of the first discrete audio signal, the second magnitude spectrogram corresponds to the desired sampling rate to which the first discrete audio signal is to be upsampled. As an example, the first magnitude spectrogram may correspond to 22,050 Hz while the second magnitude spectrogram may correspond to 44,100 Hz. Generally, the first and second magnitude spectrograms will differ from one another by at least 20,000 Hz. Then, the media production platform can apply an inverse transform to the second magnitude spectrogram to produce a second discrete audio signal that has the desired sampling rate (step 605). The inverse transform may be an inverse Fourier transform (e.g., an ISTFT) that recomposes the second magnitude spectrogram from the frequency domain into the time domain. The second discrete audio signal can be made accessible through an interface for playback purposes, or the second discrete audio signal can be stored in a memory.

Figure 7:
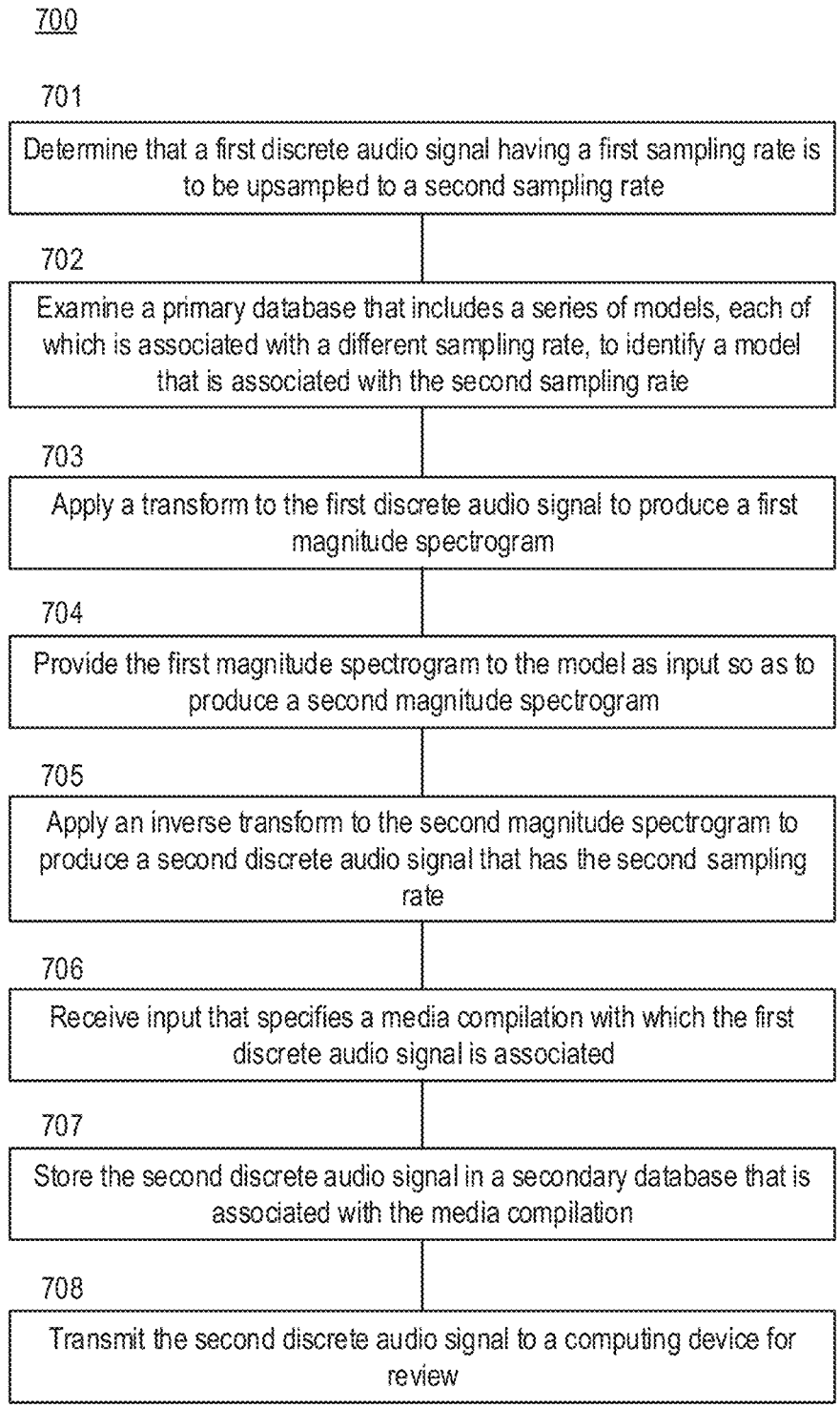
FIG. 7 depicts a flow diagram of another process for upsampling discrete audio signals.

FIG. 7 depicts a flow diagram of another process 700 for upsampling discrete audio signals. Initially, the media production platform can determine that a first discrete audio signal having a first sampling rate is to be upsampled to a second sampling rate (step 701). As discussed above, this determination may be made responsive to receiving input indicative of an instruction from an individual to upsample the first discrete audio signal. Alternatively, this determination may be made automatically based on, for example, a comparison of the first sampling rate to a predetermined threshold.

Then, the media production platform can examine a database that includes a series of models, each of which is associated with a different sampling rate, to identify a model that is associated with the second sampling rate (step 702). These models may be, for example, generative models that include one or more neural networks that are trained to produce magnitude spectrograms as output. Normally, these models are trained to accept magnitude spectrograms as input. As such, the media production may apply a transform to the first discrete audio signal to produce a first magnitude spectrogram (step 703) and then provide the first magnitude spectrogram to the model as input so as to produce a second magnitude spectrogram (step 704). Thereafter, the media production platform can apply an inverse transform to the second magnitude spectrogram to produce a second discrete audio signal that has the second sampling rate (step 705).

In some embodiments, the media production platform receives input that specifies a media compilation with which the first discrete audio signal is associated (step 706). For example, an individual may specify, when uploading the first discrete audio signal, that the first discrete audio signal was created or recorded to be included in a media compilation. As another example, the media production platform may determine that the first discrete audio signal is associated with a media compilation based on, for example, a comparison of terms spoken within the first discrete audio signal to transcripts associated with different media compilations. The media production platform may store the second discrete audio signal in a database that is associated with the media compilation (step 707).

Additionally or alternatively, the media production platform may transmit the second discrete audio signal to a computing device for review by an individual (step 708). For example, the media production platform may transmit the second discrete audio signal to the individual who initiated the process 700 (e.g., by selecting or uploading the first discrete audio signal). As another example, the media production platform may transmit the second discrete audio signal to an individual who is associated with the media compilation with which the first discrete audio signal is associated. In some embodiments, rather than transmit the second discrete audio signal to the individual, the media production platform may simply make the second discrete audio signal available to the individual for review, examination, and the like.

Other steps may also be performed in some embodiments. For example, the media production platform may post a visual representation of the second discrete audio signal to an interface that is accessible via a computer program executing on a computing device. Through the interface, an individual may be able to initiate playback of the second discrete audio signal, or the individual may be able to edit, alter, or otherwise manipulate the second discrete audio signal while producing a media compilation as discussed above with reference to FIGS. 3A-G.

Figure 8:
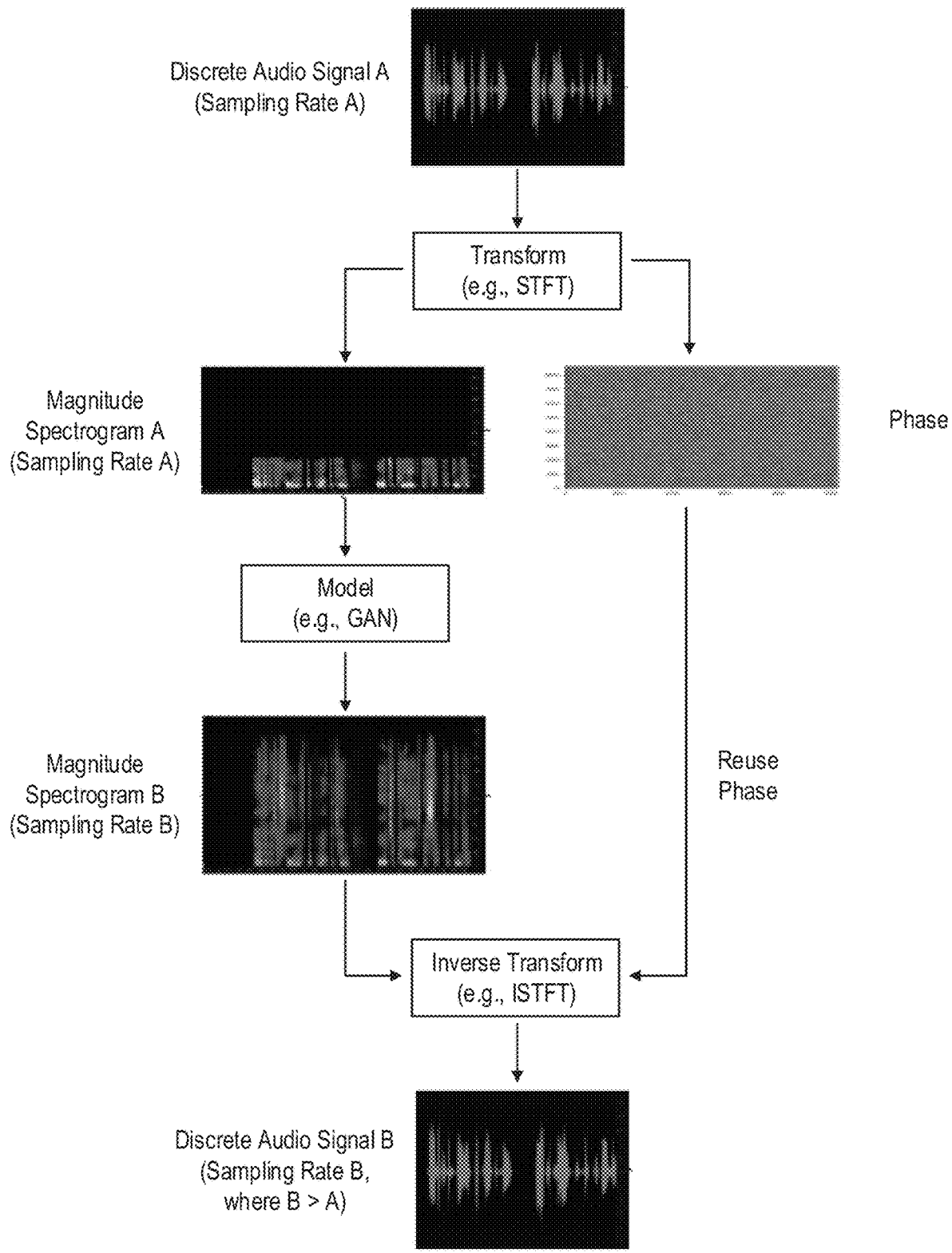
FIG. 8 includes a high-level illustration of the processes of FIGS. 6-7.

FIG. 8 includes a high-level illustration of the processes of FIGS. 6-7. As shown in FIG. 8, a first discrete audio signal ("Discrete Audio Signal A") with a first sampling rate ("Sampling Rate A") can be obtained by a media production platform. Thereafter, the media production platform may determine that the first discrete audio signal should be upsampled to a higher sampling rate ("Sampling Rate B"). For example, the media production platform may receive input indicative of an instruction to upsample the first discrete audio signal, or the media production platform may determine that the first sampling rate does not meet a predetermined threshold.

Thereafter, the media production platform can apply a transform to the first discrete audio signal to produce a first magnitude spectrogram ("Magnitude Spectrogram A") and accompanying phase. At a high level, the first magnitude spectrogram is a visual representation of the spectrum of frequencies of the first discrete audio signal over time. The media production platform can then apply a model to the first magnitude spectrogram to produce a second magnitude spectrogram ("Magnitude Spectrogram B"). As discussed above, the model can be trained to transform magnitude spectrograms to a given sampling rate (here, Sampling Rate B). By applying an inverse transform to the second magnitude spectrogram and phase associated with the first magnitude spectrogram, the media production platform can obtain a second discrete audio signal ("Discrete Audio Signal B") that has the higher sampling rate.

Processing System

Figure 9:
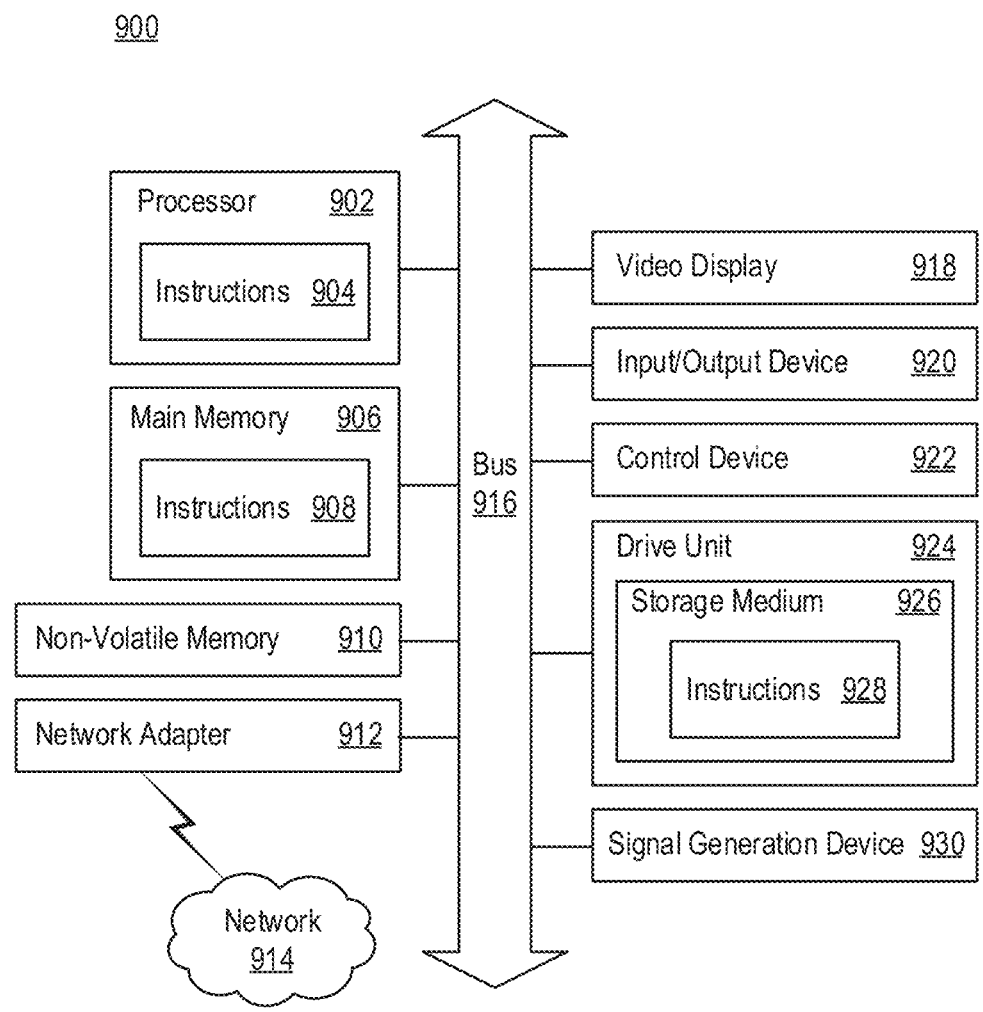
FIG. 9 is a block diagram illustrating an example of a processing system in which at least some operations described herein can be implemented.

FIG. 9 is a block diagram illustrating an example of a processing system 900 in which at least some operations described herein can be implemented. For example, components of the processing system 900 may be hosted on a computing device on which a media production platform executes, or components of the processing system 900 may be hosted on a computing device with which the media production platform is accessed.

The processing system 900 may include a processor 902, main memory 906, non-volatile memory 910, network adapter 912 (e.g., a network interface), video display 918, input/output device 920, control device 922 (e.g., a keyboard, pointing device, or mechanical input such as a button), drive unit 924 that includes a storage medium 926, or signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit ($I^2C$) bus, or bus compliant with Institute of Electrical and Electronics Engineers (IEEE) Standard 1394.

The processing system 900 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 900.

While the main memory 906, non-volatile memory 910, and storage medium 926 are shown to be a single medium, the terms "storage medium" and "machine-readable medium" should be taken to include a single medium or multiple media that stores one or more sets of instructions 928. The terms "storage medium" and "machine-readable medium" should also be taken to include any medium that is capable of storing, encoding, or carrying a set of instructions for execution by the processing system 900.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memories and storage devices in a computing device. When read and executed by the processor 902, the instructions cause the processing system 900 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 910, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 912 enables the processing system 900 to mediate data in a network 914 with an entity that is external to the processing system 900 through any communication protocol supported by the processing system 900 and the external entity. The network adapter 912 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

The technology introduced here can be implemented using software, firmware, hardware, or any combination thereof. For example, aspects of the present disclosure may be implemented using special-purpose hardwired (i.e., non-programmable) circuitry in the form of application-specific integrated circuits (ASICs), programmable logic devices (PLDs), field-programmable gate arrays (FPGAs), and the like.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the art to understand the claimed subject matter, the various embodiments, and the various modifications that are suited to the particular uses that are contemplated.

Although the Detailed Description describes various embodiments, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for implementing a generative adversarial network, the method comprising:
    receiving, by a processor, input that is indicative of a selection of a first discrete audio signal to be upsampled from a first sampling rate to a second sampling rate;
    examining, by the processor, a database that includes multiple generative adversarial networks associated with different sampling rates, so as to identify the generative adversarial network that is associated with the second sampling rate;
    applying, by the processor, a transform to the first discrete audio signal to produce a first magnitude spectrogram;
    providing, by the processor, the first magnitude spectrogram to the generative adversarial network as input so as to produce a second magnitude spectrogram,
        wherein the second magnitude spectrogram is generated from the first magnitude spectrogram by the generative adversarial network by adjusting a characteristic learned, during training, from analysis of multiple magnitude spectrograms, each of which is associated with a different discrete audio signal having the second sampling rate; and
    applying, by the processor, an inverse transform to the second magnitude spectrogram to produce a second discrete audio signal having the second sampling rate.

2. The method of claim 1, wherein the generative adversarial network includes a pair of neural networks that are trained using the multiple magnitude spectrograms that correspond to different discrete audio signals that have the second sampling rate.

3. The method of claim 1, further comprising:
    receiving, by the processor, second input indicative of a selection of the second sampling rate.

4. The method of claim 1, further comprising:
    receiving input indicative of an identification of a media compilation with which the first discrete audio signal is associated; and
    storing the second discrete audio signal in a database that is associated with the media compilation.

5. The method of claim 1, wherein the transform is a short-time Fourier transform (STFT).

6. The method of claim 5, wherein the inverse transform is an inverse short-time Fourier transform (ISTFT).

7. The method of claim 1, further comprising:
    posting a visual representation of the second discrete audio signal to a network-accessible interface.

8. The method of claim 7, wherein playback of the second discrete audio signal is initiable through the network-accessible interface.

9. A method comprising:
    determining, by a processor, that
        (i) a first discrete audio signal having a first sampling rate and acquired from a first source is to be upsampled to a given sampling rate, and
        (ii) a second discrete audio signal having a second sampling rate and acquired from a second source is to be upsampled to the given sampling rate;
    applying, by the processor, a Fourier transform to the first and second discrete audio signals to produce a first magnitude spectrogram for the first discrete audio signal and a second magnitude spectrogram for the second discrete audio signal;

acquiring, by the processor,
- a first generative model that includes a first neural network trained to facilitate upsampling from the first sampling rate to the given sampling rate, and
- a second generative model that includes a second neural network trained to facilitate upsampling from the second sampling rate to the given sampling rate;

providing, by the processor, the first magnitude spectrogram to the first generative model as input so as to produce a third magnitude spectrogram;

providing, by the processor, the second magnitude spectrogram to the second generative model as input so as to produce a fourth magnitude spectrogram; and applying, by the processor, an inverse Fourier transform to the third and fourth magnitude spectrograms to produce a third discrete audio signal having the given sampling rate for the third magnitude spectrogram and a fourth discrete audio signal having the given sampling rate for the fourth magnitude spectrogram.

10. The method of claim 9, further comprising:
receiving, by the processor, input indicative of an instruction to upsample the first and second discrete audio signals to the given sampling rate;
wherein said determining is performed responsive to said receiving.

11. The method of claim 9, further comprising:
discovering, by the processor, that the first sampling rate of the first discrete audio signal and the second sampling rate of the second discrete audio signal fall beneath a predetermined threshold;
wherein said determining is performed responsive to said discovering.

12. The method of claim 9, further comprising:
generating, by the processor, an interface through which playback of the third and fourth discrete audio signals is initiable.

13. The method of claim 9, wherein the first and second generative models are generative adversarial networks that are trained in an unsupervised manner to output magnitude spectrograms corresponding to the given sampling rate.

14. The method of claim 9, further comprising:
transmitting, by the processor, the third and fourth discrete audio signals to a computing device for review by an individual.

15. The method of claim 9, wherein the first sampling rate differs from the given sampling rate by at least 20,000 hertz (Hz), and wherein the second sampling rate differs from the given sampling rate by at least 20,000 Hz.

* * * * *